(12) United States Patent
Kimura et al.

(10) Patent No.: US 9,249,977 B2
(45) Date of Patent: Feb. 2, 2016

(54) COMBUSTOR WITH ACOUSTIC LINER

(71) Applicant: MITSUBISHI HEAVY INDUSTRIES, LTD., Tokyo (JP)

(72) Inventors: Yuichiro Kimura, Tokyo (JP); Satoshi Takiguchi, Tokyo (JP); Keisuke Matsuyama, Tokyo (JP); Satoshi Mizukami, Tokyo (JP); Shinji Akamatsu, Tokyo (JP); Kenji Sato, Tokyo (JP); Hikaru Katano, Tokyo (JP); Shigemi Mandai, Takasago (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 487 days.

(21) Appl. No.: 13/683,754

(22) Filed: Nov. 21, 2012

(65) Prior Publication Data

US 2013/0160453 A1    Jun. 27, 2013

(30) Foreign Application Priority Data

Nov. 22, 2011    (JP) .................................. 2011-254979

(51) Int. Cl.
| | |
|---|---|
| F02C 7/24 | (2006.01) |
| F23R 3/00 | (2006.01) |
| F23R 3/06 | (2006.01) |
| F01D 9/02 | (2006.01) |
| F02C 7/12 | (2006.01) |

(52) U.S. Cl.
CPC ................ *F23R 3/002* (2013.01); *F01D 9/023* (2013.01); *F02C 7/12* (2013.01); *F23R 3/06* (2013.01); *F23R 2900/00014* (2013.01); *F23R 2900/03042* (2013.01)

(58) Field of Classification Search
CPC .. F23R 3/002; F23R 3/06; F23R 2900/00014; F02C 7/24; F23M 20/005; F01N 1/023
USPC .................................. 60/752–760, 725, 39.77
See application file for complete search history.

(56) References Cited

U.S. PATENT DOCUMENTS

| | | | |
|---|---|---|---|
| 4,312,186 A | * | 1/1982 | Reider ............................ 60/754 |
| 4,315,406 A | | 2/1982 | Bhangu et al. |

(Continued)

FOREIGN PATENT DOCUMENTS

| | | |
|---|---|---|
| JP | 58-072822 A | 4/1983 |
| JP | 2000-145479 A | 5/2000 |

(Continued)

OTHER PUBLICATIONS

International Search Report of PCT/JP2012/080278, mailing date Feb. 5, 2013.

(Continued)

*Primary Examiner* — Steven Sutherland
(74) *Attorney, Agent, or Firm* — Westerman, Hattori, Daniels & Adrian, LLP (57) ABSTRACT

A combustor includes a combustion chamber and an acoustic liner, wherein through-holes through are formed in a wall of the combustion chamber, a plurality of rows of the through-holes is arranged in a lengthwise direction of the combustor, the through-holes of a first through-hole row are shifted with respect to the through-holes of a second through-hole row so that centers of the through-holes of the first and second through-hole rows adjacent each other are staggered in the circumferential direction, cooling grooves are formed so as to avoid the through-holes inside that is sandwiched between the outer peripheral surface and the inner peripheral surface of the combustion chamber, and the cooling grooves include transverse cooling grooves extending in the circumferential direction between rows of the through-holes, and longitudinal cooling grooves extending in the lengthwise direction between the through-holes and connecting the transverse cooling grooves adjacent to each other.

7 Claims, 6 Drawing Sheets

(56) References Cited

U.S. PATENT DOCUMENTS

| | | | |
|---|---|---|---|
| 6,282,905 B1 | 9/2001 | Sato et al. | |
| 6,427,446 B1* | 8/2002 | Kraft et al. | 60/737 |
| 6,640,544 B2* | 11/2003 | Suenaga et al. | 60/725 |
| 7,311,175 B2 | 12/2007 | Proscia et al. | |
| 8,146,364 B2 | 4/2012 | Johnson et al. | |
| 2002/0066272 A1 | 6/2002 | Suenaga et al. | |
| 2010/0083665 A1 | 4/2010 | Hoffmann | |
| 2010/0186411 A1 | 7/2010 | Matsuyama et al. | |
| 2010/0229564 A1 | 9/2010 | Chila | |
| 2011/0247341 A1* | 10/2011 | McMahan et al. | 60/757 |
| 2012/0198854 A1 | 8/2012 | Schilp et al. | |

FOREIGN PATENT DOCUMENTS

| | | | |
|---|---|---|---|
| JP | 2004-44538 A | 2/2004 | |
| JP | 2005-315473 A | 11/2005 | |
| JP | 2006-9785 A | 1/2006 | |
| JP | 2006-097981 A | 4/2006 | |
| JP | 2006-132505 A | 5/2006 | |
| JP | 2007-107540 A | 4/2007 | |
| JP | 2007-120504 A | 5/2007 | |
| JP | 4146492 B2 | 9/2008 | |
| JP | 2009-097841 A | 5/2009 | |

OTHER PUBLICATIONS

Written Opinion of PCT/JP2012/080278, mailing date Feb. 5, 2013.
Office Action dated Apr. 3, 2015, issued in corresponding Chinese Patent Application No. 201280056972.1 with partial English translation (11 pages).
Extended European Search Report dated Jun. 5, 2015, issued in counterpart European patent application No. 12852289.3 (8 pages).
Office Action dated Aug. 18, 2015, issued in counterpart Korean Patent Application No. 10-2014-7015973, with English translation (11 pages).

* cited by examiner

COMBUSTOR WITH ACOUSTIC LINER

TECHNICAL FIELD

The present invention relates to a combustor for a gas turbine, and particularly, to the wall surface cooling of a combustor.

Priority is claimed on Japanese Patent Application No. 2011-254979 filed on Nov. 22, 2011, the contents of which are incorporated herein by reference.

BACKGROUND ART

When performing the wall surface cooling of a combustion chamber in a gas turbine combustor, cooling is performed by cooling grooves provided on the inside of the wall surface of the combustion chamber, and thus an increase in the temperature of the wall surface is suppressed.

Since the wall surface of the combustion chamber is cooled by the cooling grooves in this manner, if the temperature of the wall surface rises and the concentration of premixed gas in the combustion chamber become high, the combustion on the wall surface, that is, the wall surface combustion is generated. Then, if such wall surface combustion is generated, a flashback is generated in which a flame goes back toward the upstream side from the downstream side on the wall surface where the flow velocity of the premixed gas is low. Since air and fuel in the premixed gas are not sufficiently mixed with each other on the upstream side of the combustion chamber, when a flame reaches the upstream side due to the flashback and combustion on the upstream side is generated, NOx is generated.

Further, in a case where in addition to main combustion at the position of the inside in a radial direction of the combustion chamber, the wall surface combustion as described above is generated at the same axial position as the main combustion, heat generation concentration is generated at the axial position. In addition, since the wall surface combustion is unstable, large inner-pressure fluctuation occurs inside the combustion chamber depending on the presence or absence of the generation, and thus there is a concern that combustion oscillation may occur.

Here, in Patent Document 1, there is disclosed an acoustic liner that is provided on the outer peripheral surface of a combustion chamber, thereby performing combustion oscillation damping. Then, it is conceivable to form an air film on the wall surface of a combustion chamber by supplying purge air to acoustic holes of the acoustic liner as a method to prevent the above-described wall surface combustion by suppressing an increase in the temperature of a wall surface.

PRIOR ART DOCUMENT

Patent Document

[Patent Document 1] Japanese Patent Application, First Publication No. 2006-97981

SUMMARY OF INVENTION

Problem to be Solved by the Invention

However, in the acoustic liner disclosed in Patent Document 1, it is difficult to form an air film that is continuous in a circumferential direction on the inner peripheral surface (the wall surface) of the combustion chamber and there is a concern that the wall surface combustion may be generated between through-holes (the acoustic holes) in the circumferential direction.

The present invention has been made in consideration of such circumstances and its object is to provide a combustor and a gas turbine in which an air film that is continuous in a circumferential direction is formed on the inner peripheral surface of a combustion chamber, and thus prevention of the generation of wall surface combustion is possible.

Means for Solving the Problems

In order to solve the above-described problem, the invention adopts the following means.

That is, according to an aspect of the present invention, there is provided a gas turbine combustor including: a combustion chamber inside which a combustion space is formed; and an acoustic liner that is provided outside the combustion chamber and defines an acoustic space between the acoustic liner and an outer peripheral surface of the combustion chamber, wherein through-holes through which the combustion space communicates with the acoustic space are formed in a wall of the combustion chamber, a plurality of rows of the through-holes in which each row includes some of the through-holes aligned in a circumferential direction of the combustor is arranged in a lengthwise direction of the combustor, the through-holes of a first through-hole row are shifted with respect to the through-holes of a second through-hole row adjacent to the first through-hole row so that centers of the through-holes of the first and second through-hole rows adjacent each other are staggered in the circumferential direction, cooling grooves are formed so as to avoid the through-holes on the inside that is sandwiched between the outer peripheral surface and the inner peripheral surface of the combustion chamber and corresponds to a position where the acoustic liner is provided, and the cooling grooves include transverse cooling grooves extending in the circumferential direction between rows of the through-holes, and longitudinal cooling grooves extending in the lengthwise direction between the through-holes and connecting the transverse cooling grooves adjacent to each other in the lengthwise direction.

According to such a gas turbine combustor, the through-holes are disposed so as to overlap each other in the circumferential direction, and thus when purge air flows from the through-holes into the inside of the combustion chamber, an air film that is continuous in the circumferential direction is formed on the inner wall surface of the combustion chamber. Due to such an air film that is continuous in the circumferential direction, an increase in the temperature of the whole in the circumferential direction of the combustion chamber is suppressed and the mixing rate of air with fuel in the vicinity of the inner peripheral surface of the combustion chamber is increased, and thus the concentration of the fuel can be reduced.

Further, due to such cooling grooves, even in a case where the though-holes are disposed so as to overlap in the circumferential direction, the cooling grooves are provided without interfering with the through-holes, and thus the combustion chamber can be cooled and an increase in the temperature of the combustion chamber is suppressed, whereby improvement in the effect of preventing the generation of the wall surface combustion becomes possible.

In addition, the longitudinal cooling grooves are disposed alternately in the circumferential direction with respect to the lengthwise direction, and thus even in a case where the through-holes are disposed so as to overlap in the circumferential direction, the transverse cooling grooves and the longitudinal cooling grooves can be provided without interfering with the through-holes. Further, since cooling air flows to branch from the transverse cooling grooves to the longitudinal cooling grooves, the effect of cooling the combustion chamber can be improved due to improvement in heat transfer efficiency by boundary layer separation, and improvement in the effect of preventing the generation of the wall surface combustion becomes possible.

The through-holes may be made such that a hole diameter thereof on the upstream side in the lengthwise direction is large compared to a hole diameter on the downstream side.

Due to the through-holes formed in this manner, the concentration of fuel becomes high compared to that on the downstream side and more purge air flows into the inside of the combustion chamber from the upstream side where the wall surface combustion easily occurs, and thus the amount of air film can be increased. Therefore, it becomes possible to further improve the effect of preventing the generation of the wall surface combustion.

Further the through-holes may be inclined toward the inside in a radial direction of the combustion chamber as it goes toward the downstream side from the upstream side in the lengthwise direction.

Due to such the through-holes, the purge air can be supplied to a position closer to the inner peripheral surface of the combustion chamber, and thus the air film can be more reliably formed, whereby the effect of preventing the generation of the wall surface combustion can be further improved.

Further, the through-holes may have an enlarged diameter on at least one of an opening in the outer peripheral surface of the combustion chamber and an opening in the inner peripheral surface of the combustion chamber.

Due to such the through-holes, the purge air is smoothly taken in and also can be supplied so as to spread on the inner peripheral surface of the combustion chamber, and thus the air film can be more reliably formed, whereby the effect of preventing the generation of the wall surface combustion can be improved.

Further, according to another aspect of the present invention, there is provided a gas turbine combustor including: a combustion chamber inside which a combustion space is formed; and an acoustic liner that is provided outside the combustion chamber and defines an acoustic space between the acoustic liner and an outer peripheral surface of the combustion chamber, wherein through-holes through which the combustion space communicates with the acoustic space are formed in a wall of the combustion chamber, a plurality of rows of the through-holes in which each row includes some of the through-holes aligned in a circumferential direction of the combustor is arranged in a lengthwise direction of the combustor, the through-holes of a first through-hole row are coincided with respect to the through-holes of a second through-hole row adjacent to the first through-hole row, and in cooling grooves that is formed on the inside that is sandwiched between the outer peripheral surface and the inner peripheral surface of the combustion chamber between the through-holes in the circumferential direction, auxiliary through-holes making the cooling grooves and the combustion space communicate with each other is formed.

Due to such the auxiliary through-holes, it becomes possible to discharge some of cooling air flowing through the cooling grooves, from an area between the through-holes in the circumferential direction to the inside of the combustion chamber, and thus the air film that is continuous in the circumferential direction can be formed, whereby it becomes possible to prevent the generation of the wall surface combustion.

In addition, according to still another aspect to the present invention, there is provided a gas turbine that is provided with the combustor described above.

In such a gas turbine, an air film that is continuous in the circumferential direction can be formed on the inner peripheral surface of the combustion chamber of the combustor, and thus the generation of the wall surface combustion can be prevented.

EFFECTS OF THE INVENTION

According to the combustor and the gas turbine related to the present invention, an air film that is continuous in the circumferential direction can be formed on the inner peripheral surface of the combustion chamber, and thus it becomes possible to attain prevention of the wall surface combustion.

DESCRIPTION OF EMBODIMENTS

Hereinafter, a gas turbine 1 related to embodiments of the present invention will be described.

Figure 1:
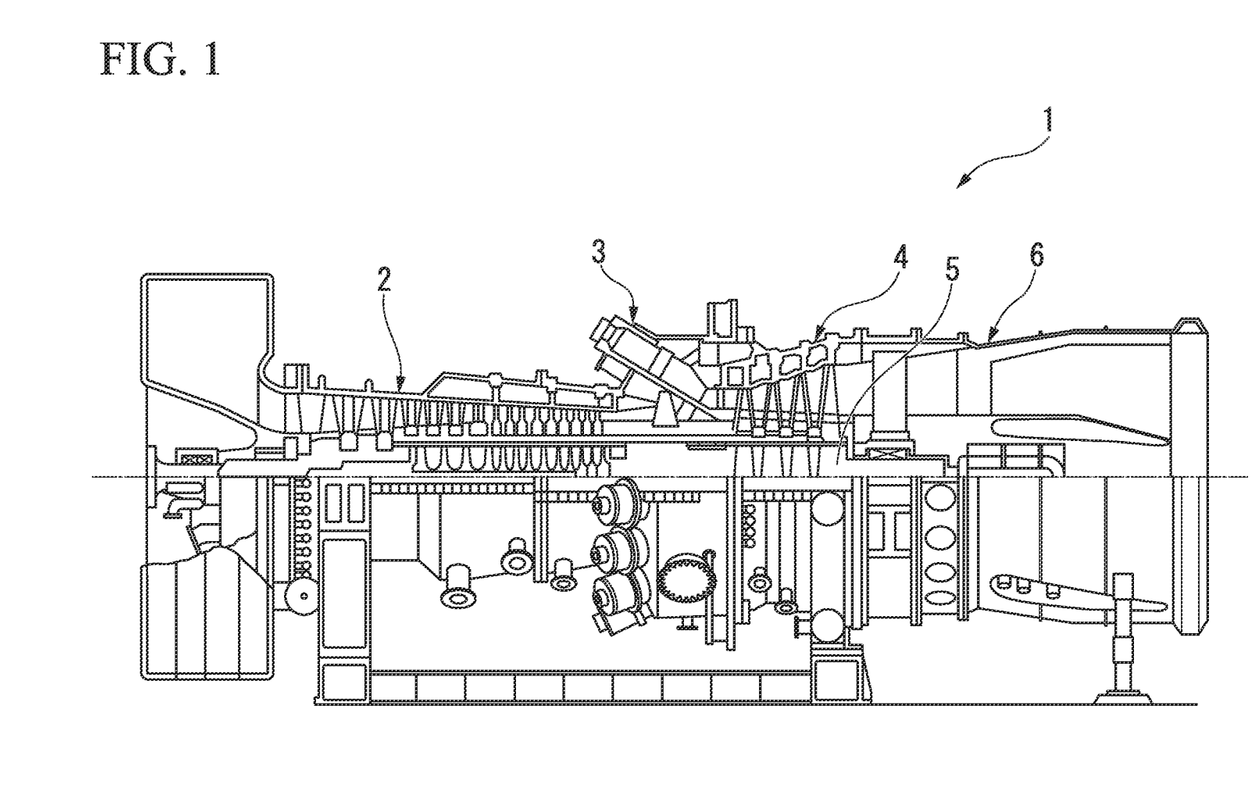
FIG. 1 is the overall schematic diagram of a gas turbine related to a first embodiment of the invention.

As shown in FIG. 1, the gas turbine 1 is constituted so as to mix compressed air A generated in a compressor 2 with fuel F in a combustor (a gas turbine combustor) 3 and then burn the mixture, thereby generating high-temperature and high-pressure combustion gas G Then, the combustion gas G flows in a turbine 4, thereby rotating a rotor 5 of the turbine 4 to thereby obtain rotative power, and the combustion gas G is exhausted through an exhaust chamber 6 after it rotates the turbine 4.

In addition, in the following, the compressor 2 side (the left side in the plane of paper of FIG. 1) of the gas turbine 1 is referred to as an upstream side and the exhaust chamber 6 side (the right side in the plane of paper of FIG. 1) is referred to as a downstream side.

Figure 2:
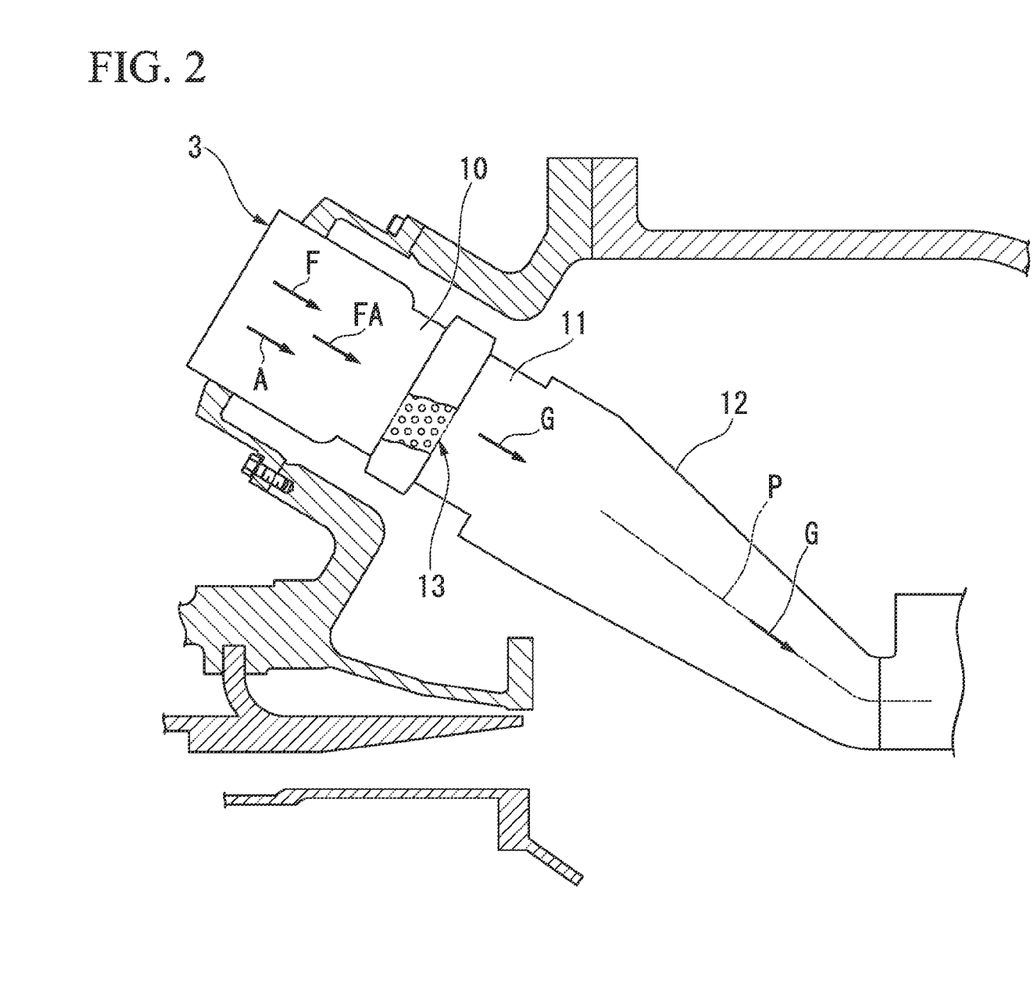
FIG. 2 is the overall schematic diagram of a combustor in the gas turbine related to the first embodiment of the invention.

Next, the combustor 3 will be described with reference to FIG. 2.

The combustor 3 includes a fuel feeder 10 that supplies the fuel F and the compressed air A from the compressor 2, a combustion chamber 11 that burns the fuel F and the compressed air A, thereby generating the high-temperature and high-pressure combustion gas G, a transition piece 12 that is connected to the combustion chamber 11, and an acoustic unit 13 that is provided outside the combustion chamber 11.

The fuel feeder 10 supplies premixed gas FA obtained by premixing the fuel F with the compressed air A to the combustion chamber 11 to burn the premixed gas FA.

The combustion chamber 11 has an approximately cylindrical shape centered on an axis P, is connected to the fuel feeder 10 at the upstream side, and generates the combustion gas G in a combustion space of the inside. Then, the downstream side is connected to the transition piece 12 and enables the combustion gas G to flow in the turbine 4 through the transition piece 12.

The transition piece 12 is a member having an approximately cylindrical shape, which is connected to the combustion chamber 11 at the upstream side and also connected to the turbine 4 at the downstream side, and supplies the combustion gas G generated in the combustion chamber 11 to the turbine 4.

Figure 3:
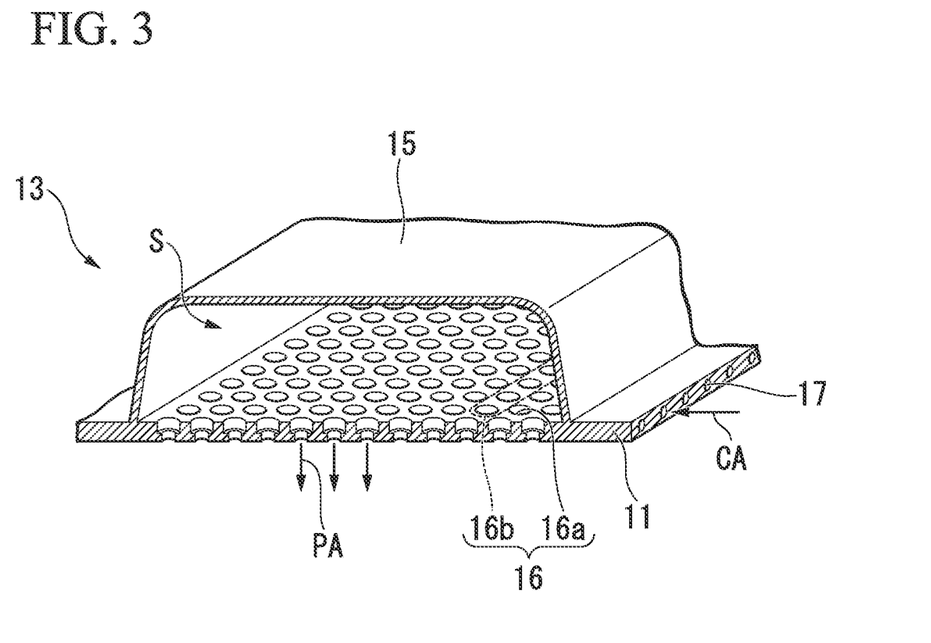
FIG. 3 is a perspective view showing an acoustic liner of the combustor regarding the gas turbine related to the first embodiment of the invention.

As shown in FIG. 3, the acoustic unit 13 has an acoustic liner 15 that is provided on the outer peripheral surface of the combustion chamber 11, a group of through-holes 16 that is formed to make the inside and outside of the combustion chamber 11 communicate with each other at the installation position of the acoustic liner 15, and cooling grooves 17 that are formed on the inside which is sandwiched between the outer peripheral surface and the inner peripheral surface of the combustion chamber 11 at the installation position of the acoustic liner 15.

The acoustic liner 15 is a ring-shaped member that is provided to round the outer peripheral surface of the combustion chamber 11 in a circumferential direction. Further, the acoustic liner 15 is provided to define a space (an acoustic space) S between it and the outer peripheral surface of the combustion chamber 11, so as to cover the outer peripheral surface from the outside in a radial direction.

The group of through-holes 16 includes a plurality of through-holes 16a formed so as to make the inside and outside of the combustion chamber 11 communicate with each other at the installation position of the acoustic liner 15, and introduces purge air PA toward the inside from the outside of the combustion chamber 11. Further, in the group of through-holes 16, the through-holes 16a that are disposed at intervals in the circumferential direction of the combustion chamber 11 constitute a through-hole row 16b, and a plurality of rows of the through-holes 16b is arranged at intervals in the direction of the axis P.

Then, rows of the through-holes 16b are disposed such that the respective through-holes 16a overlap in the circumferential direction in a state where the central axes of the through-holes 16a adjacent to each other in the direction of the axis P are shifted in the circumferential direction. In addition, a state of overlapping in the circumferential direction is set to include even a state where the outer peripheries of the through-holes 16a come into contact with each other in the circumferential direction.

Figure 4:
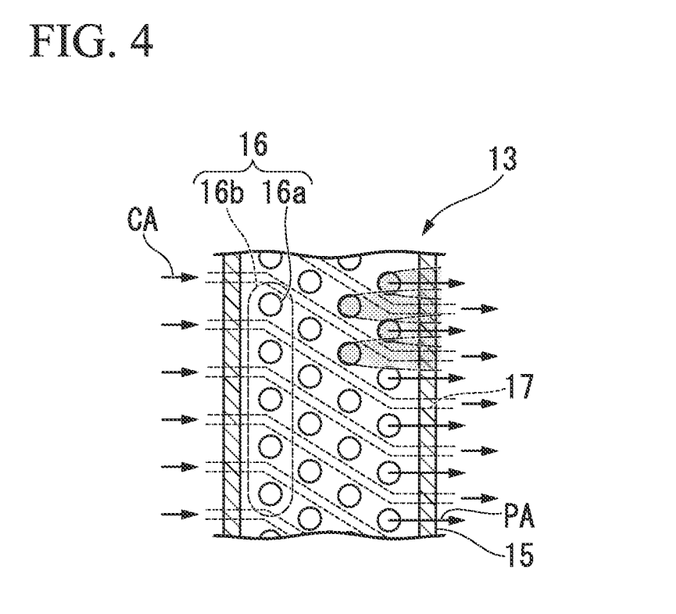
FIG. 4 is a diagram showing the positional relationship between through-holes and cooling grooves in the acoustic liner of the combustor regarding the gas turbine related to the first embodiment of the invention and is a diagram when viewing FIG. 3 from the inner peripheral surface side of a combustion chamber.

As shown in FIG. 4, the cooling grooves 17 are a flow path that is formed on the inside which is sandwiched between the outer peripheral surface and the inner peripheral surface of the combustion chamber 11 at the installation position of the acoustic liner 15, thereby enabling cooling air CA to flow therethrough. Then, the cooling grooves 17 are formed to be inclined toward the downstream side from the upstream side in the direction of the axis P and toward the other side from one side in the circumferential direction, so as to avoid the installation position of the through-holes 16a.

In addition, the cooling grooves 17 are continuously formed on the inside between the outer peripheral surface and the inner peripheral surface of the combustion chamber 11 even at positions other than the formation position of the group of through-holes 16, and since at the positions other than the formation position of the group of through-holes 16, it is not necessary to form the cooling grooves 17 at a slant, in this embodiment, the cooling grooves 17 are formed parallel in the direction of the axis P.

In the gas turbine 1, since the respective through-holes 16a are disposed so as to overlap each other in the circumferential direction, as shown by a dashed-dotted line in FIG. 4, the purge air PA from the through holes 16a adjacent to each other in the circumferential direction flows from the through-holes 16a into the inside of the combustion chamber 11 in a manner of overlapping in the circumferential direction. That is, since the purge air PA is made to be continuous in the circumferential direction, an air film that is continuous in the circumferential direction is formed on the inner peripheral surface of the combustion chamber 11. The entire combustion chamber 11 can be cooled without omission by such an air film that is continuous in the circumferential direction, and thus an increase in the temperature of the combustion chamber 11 can be suppressed. In addition, since a mixing rate of air with the fuel F in the vicinity of the inner peripheral surface of the combustion chamber 11 can be increased due to such an air film and the concentration of the fuel F can be reduced, prevention of the generation of wall surface combustion becomes possible.

Here, for example, it is also possible to provide a separate air supply hole at a position different from the installation position of the acoustic liner 15 in order to form an air film that is continuous in the circumferential direction. However, in this case, the amount of compressed air A for combustion is reduced, and thus a mixing rate of air with the fuel F is reduced, whereby an increase in the generation of NOx according to an increase in flame temperature is concerned.

In this regard, in this embodiment, since the cooling grooves 17 are formed to be inclined with respect to the direction of the axis P, whereby it is possible to provide the cooling grooves 17 without interfering with the through-holes 16a, and the air film that is continuous in the circumferential direction can be formed by using the purge air PA, an increase in the generation of NOx according to an increase in flame temperature can be suppressed. In addition, since the cooling grooves 17 do not become a complicated structure by forming the cooling grooves 17 at a slant, the combustion chamber 11 can be reliably cooled while maintaining the durability of the combustion chamber 11 and an increase in the temperature of the combustion chamber 11 is suppressed, and thus it becomes possible to improve the effect of preventing the generation of the wall surface combustion.

According to the gas turbine 1 of this embodiment, an increase in the temperature of the inner peripheral surface of the combustion chamber 11 can be suppressed by the air film that is continuous in the circumferential direction and the effect of suppressing an increase in temperature can be improved by the cooling grooves 17. Further, since a reduction in the concentration of the fuel F also becomes possible due to the air film, prevention of the generation of the wall surface combustion can be reliably achieved.

Then, due to the prevention of the generation of the wall surface combustion, the generation of NOx on the upstream side of the combustion chamber 11 that is caused by the flashback described above, or the generation of combustion oscillation by heat generation concentration and inner pressure fluctuation in the inside of the combustion chamber 11 can be prevented, thereby resulting in improvement of the performance of the gas turbine 1.

Next, a gas turbine 1 related to a second embodiment will be described.

In addition, the same constituent element as that in the first embodiment is denoted by the same sign and a detailed description thereof is omitted here.

Figure 5:
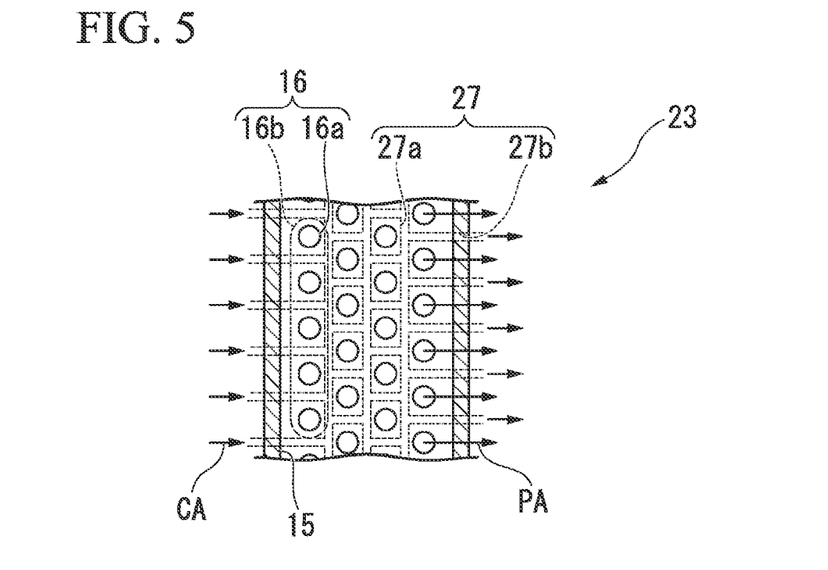
FIG. 5 is a diagram showing the positional relationship between through-holes and cooling grooves in an acoustic liner of a combustor regarding a gas turbine related to a second embodiment of the invention.

As shown in FIG. 5, in the gas turbine 1 of this embodiment, an acoustic unit 23 has cooling grooves 27 instead of the cooling grooves 17 in the first embodiment, and the cooling grooves 27 include transverse cooling grooves 27a and longitudinal cooling grooves 27b.

The transverse cooling grooves 27a are formed on the inside that is sandwiched between the outer peripheral surface and the inner peripheral surface of the combustion chamber 11 at the installation position of the acoustic liner 15, thereby becoming a flow path that enables the cooling air CA to flow therethrough. Then, the transverse cooling grooves 27a extend in the circumferential direction between rows of the through-holes 16b adjacent to each other in the direction of the axis P, so as to avoid the installation position of the through-holes 16a.

The longitudinal cooling grooves 27b are formed on the inside that is sandwiched between the outer peripheral surface and the inner peripheral surface of the combustion chamber 11 at the installation position of the acoustic liner 15, thereby becoming a flow path that enables the cooling air CA to flow therethrough, similarly to the transverse cooling grooves 27a, and extends in the direction of the axis P between the through-holes 16a adjacent to each other in the circumferential direction, so as to avoid the through-holes 16a, thereby connecting the transverse cooling grooves 27a adjacent to each other in the direction of the axis P. In this way, the longitudinal cooling grooves 27b are disposed alternately in the circumferential direction with respect to the direction of the axis P.

In addition, also at the positions of the combustion chamber 11 other than the formation position of the group of through-holes 16, cooling grooves (not shown) are formed so as to be continuous with the transverse cooling grooves 27a and the longitudinal cooling grooves 27b. However, at this position, the cooling grooves 27 need not have the transverse cooling grooves 27a and the longitudinal cooling grooves 27b.

In the gas turbine 1, the air film that is continuous in the circumferential direction is formed on the inner peripheral surface of the combustion chamber 11, and thus prevention of the generation of the wall surface combustion becomes possible. In addition, due to the transverse cooling grooves 27a and the longitudinal cooling grooves 27b, it is possible to provide the cooling grooves 27 without interfering with the through-holes 16a, and the cooling air CA flows to branch from the transverse cooling grooves 27a to the longitudinal cooling grooves 27b. At this time, improvement in the effect of cooling the combustion chamber 11 becomes possible due to improvement in heat transfer efficiency by boundary layer separation and the combustion chamber 11 is reliably cooled, and thus an increase in temperature is suppressed and the effect of preventing the generation of the wall surface combustion can be improved.

According to the gas turbine 1 of this embodiment, an increase in the temperature of the combustion chamber 11 can be suppressed by the air film that is continuous in the circumferential direction and the effect of suppressing an increase in temperature can be improved by the transverse cooling grooves 27a and the longitudinal cooling grooves 27b. Further, since a reduction in the concentration of the fuel F also becomes possible due to the air film, prevention of the generation of the wall surface combustion can be reliably attained.

Then, by the prevention of the generation of the wall surface combustion, the generation of NOx on the upstream side of the combustion chamber 11 due to the flashback described above, or the generation of combustion oscillation can be prevented, thereby resulting in improvement of the performance of the gas turbine 1.

Next, a gas turbine 1 related to a third embodiment will be described.

In addition, the same constituent elements as those in the first embodiment and the second embodiment are denoted by the same signs and a detailed description thereof is omitted here.

Figure 6:
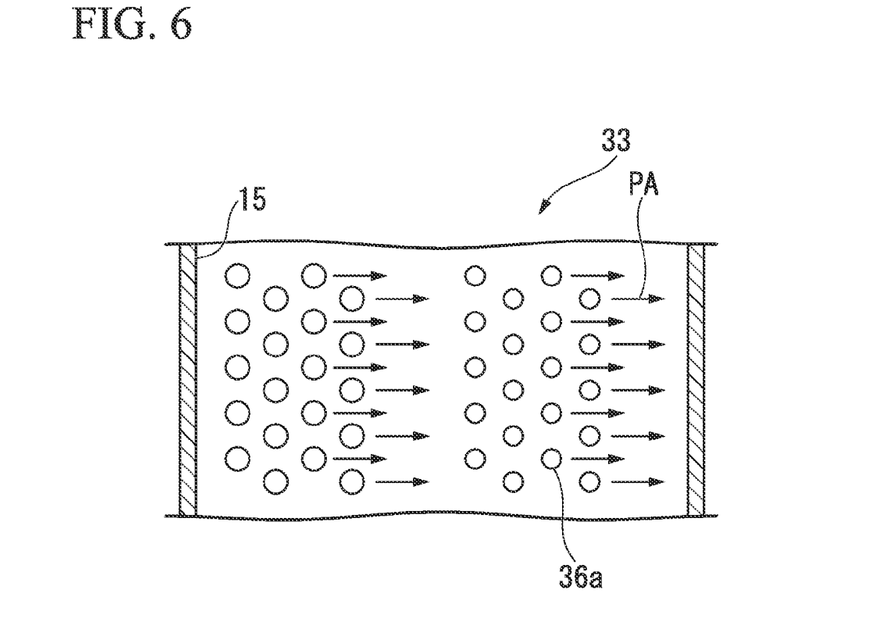
FIG. 6 is a diagram showing the positional relationship between through-holes and cooling grooves in an acoustic liner of a combustor regarding a gas turbine related to a third embodiment of the invention.

The gas turbine 1 of this embodiment is different from those in the first embodiment and the second embodiment in terms of through-holes 36a in an acoustic unit 33.

As shown in FIG. 6, the through-holes 36a are formed such that a hole diameter on the upstream side is large compared to that on the downstream side in the direction of the axis P.

In the gas turbine 1, the concentration of the fuel F on the upstream side of the inside of the combustion chamber 11 becomes high compared to that on the downstream side, whereby the wall surface combustion easily occurs. However, by making the hole diameter of the through-holes 36a on the upstream side larger, it becomes possible to make more purge air PA flow into the inside of the combustion chamber 11, and thus the amount of the air film that is formed on the upstream side can be increased. Therefore, it becomes possible to further improve the effect of preventing the generation of the wall surface combustion.

According to the gas turbine 1 of this embodiment, suppression of an increase in the temperature of the combustion chamber 11 and a reduction in the concentration of the fuel F become possible due to the air film that is continuous in the circumferential direction, and in addition, the air film that is formed on the upstream side is enhanced, whereby prevention of the generation of the wall surface combustion can be reliably achieved.

In addition, cooling grooves that are formed on the inside which are sandwiched between the outer peripheral surface and the inner peripheral surface of the combustion chamber 11 in this embodiment may be the cooling grooves 17 described in the first embodiment and may also be the transverse cooling grooves 27a and the longitudinal cooling grooves 27b as in the second embodiment.

Next, a gas turbine 1 related to a fourth embodiment will be described.

In addition, the same constituent elements as those in the first embodiment to the third embodiment are denoted by the same signs and a detailed description thereof is omitted here.

Figure 7A:
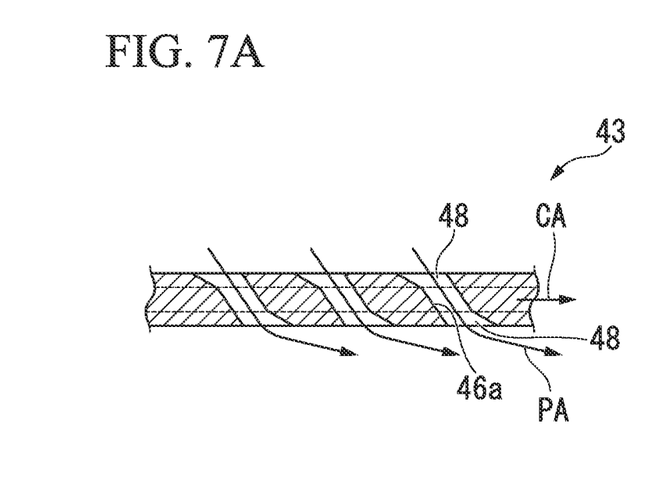
FIG. 7A is a cross-sectional view showing the shape of through-holes in an acoustic liner of a combustor regarding a gas turbine related to a fourth embodiment of the invention.
Figure 7B:
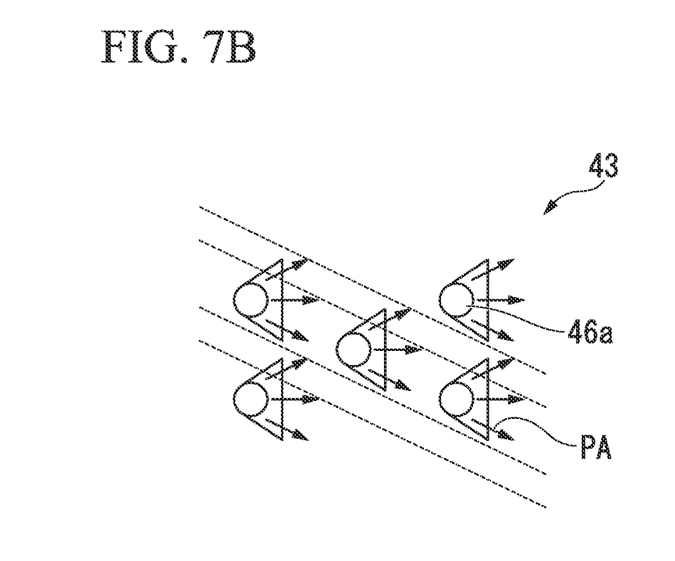
FIG. 7B is a diagram when viewing the through-holes in the acoustic liner of the combustor regarding the gas turbine related to the fourth embodiment of the invention from the inner peripheral surface side of a combustion chamber.

The gas turbine 1 of this embodiment is different from those in the first embodiment to the third embodiment in terms of through-holes 46a of an acoustic unit 43.

As shown in FIGS. 7A and 7B, the through-holes 46a are formed to be inclined radially inward toward the axis P as it goes toward the downstream side from the upstream side in the direction of the axis P. Further, the through-holes 46a are formed such that in the inner peripheral surface of the combustion chamber 11, the diameter is enlarged to both sides in the circumferential direction toward the downstream side in the direction of the axis P, and in the outer peripheral surface, the diameter is enlarged to both sides in the circumferential direction toward the upstream side in the direction of the axis P. That is, in a case where opening portions 48 of the through-holes 46a are viewed from the radial direction, the opening portions 48 have an approximately triangular shape.

In the gas turbine 1, the generation of the wall surface combustion can be prevented by forming the air film that is continuous in the circumferential direction. In addition, the through-holes 46a are formed at a slant and the diameter of the opening portions 48 on at least one side of the inner periphery side and the outer periphery side is enlarged, whereby the purge air PA can be smoothly taken in the through-holes 46a and flow out so as to spread on the inner peripheral surface of the combustion chamber 11 to a position closer to the inner peripheral surface. Therefore, it becomes possible to increase the amount of air film, thereby further enhancing the air film, and thus further prevention of the generation of the wall surface combustion can be attained.

According to the gas turbine 1 of this embodiment, the air film that is continuous in the circumferential direction is enhanced, and thus suppression of an increase in the temperature of the combustion chamber 11 and a reduction in the concentration of the fuel F becomes possible and prevention of the generation of the wall surface combustion can be more reliably achieved.

In addition, the through-holes 46a may also be formed as a simple inclined hole without forming the opening portions 48 of the through-holes 46a so as to have an enlarged diameter, and in this case, the effort of enlarging the diameter of the opening portions 48 by using machining or the like can be reduced, and thus the cost can be reduced.

Next, a gas turbine 1 related to a fifth embodiment will be described.

In addition, the same constituent elements as those in the first embodiment to the fourth embodiment are denoted by the same signs and a detailed description thereof is omitted here.

Figure 8:
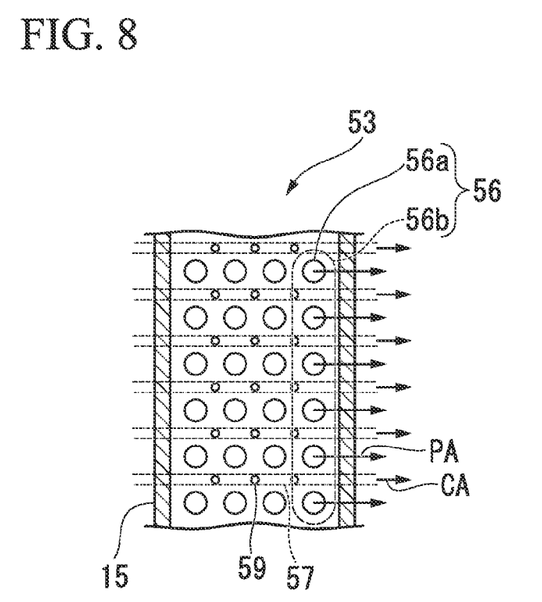
FIG. 8 is a diagram showing the positional relationship between through-holes and cooling grooves in an acoustic liner of a combustor regarding a gas turbine related to a fifth embodiment of the invention.

The gas turbine 1 of this embodiment is different from those in the first embodiment to the fourth embodiment in that disposition of a group of through-holes 56 of an acoustic unit 53 and disposition of cooling grooves 57 are made to be different and auxiliary through-holes 59 are further formed between through-holes 56a.

As shown in FIG. 8, the acoustic unit 53 includes the acoustic liner 15 that is provided on the outer peripheral surface of the combustion chamber 11, a group of through-holes 56 that is formed to make the inside and outside of the combustion chamber 11 communicate with each other at the installation position of the acoustic liner 15, cooling grooves 57 that is provided on the inside which is sandwiched between the outer peripheral surface and the inner peripheral surface of the combustion chamber 11 at the installation position of the acoustic liner 15, and the auxiliary through-holes 59 that is formed between the through-holes 56a.

The group of through-holes 56 includes a plurality of through-holes 56a formed so as to make the inside and outside of the combustion chamber 11 communicate with each other at the installation position of the acoustic liner 15, and introduces the purge air PA toward the inside from the outside of the combustion chamber 11. Then, in the group of through-holes 56, the through-holes 56a that are disposed at intervals in the circumferential direction of the combustion chamber 11 constitute a through-hole row 56b, and a plurality of rows of the through-holes 56b is arranged at intervals in the direction of the axis P.

Then, rows of the through-holes 56b that are arranged in the lengthwise direction are disposed in a state where the central axes of the through-holes 56a adjacent to each other in the direction of the axis P coincide with each other in the circumferential direction.

The cooling grooves 57 become a flow path that is formed on the inside which is sandwiched between the outer peripheral surface and the inner peripheral surface of the combustion chamber 11 at the installation position of the acoustic liner 15, thereby enabling the cooling air CA to flow therethrough. Then, the cooling grooves 57 are formed toward the downstream side from the upstream side in the direction of the axis P between the through-holes 56a adjacent to each other in the circumferential direction so as to avoid the installation position of the through-holes 56a.

The auxiliary through-holes 59 are a flow path that is formed radially inward on the cooling grooves 57 so as to make the cooling grooves 57 and the inside of the combustion chamber 11 communicate with each other, and enables some of the cooling air CA flowing through the cooling grooves 57 to be discharged to the inner peripheral surface of the combustion chamber 11.

In the gas turbine 1, even if the through-holes 56a adjacent to each other in the circumferential direction are disposed at intervals in the circumferential direction, since the auxiliary through-hole 59 is formed in this interval, it becomes possible to form the air film that is continuous in the circumferential direction, on the inner peripheral surface of the combustion chamber 11, and thus prevention of the generation of the wall surface combustion becomes possible.

According to the gas turbine 1 of this embodiment, the configuration of the cooling grooves 57 are simplified, and thus the air film that is continuous in the circumferential direction can be formed while suppressing the cost, suppression of an increase in the temperature of the combustion chamber 11 and a reduction in the concentration of the fuel F can be achieved, and prevention of the generation of the wall surface combustion can be reliably attained.

Figure 9:
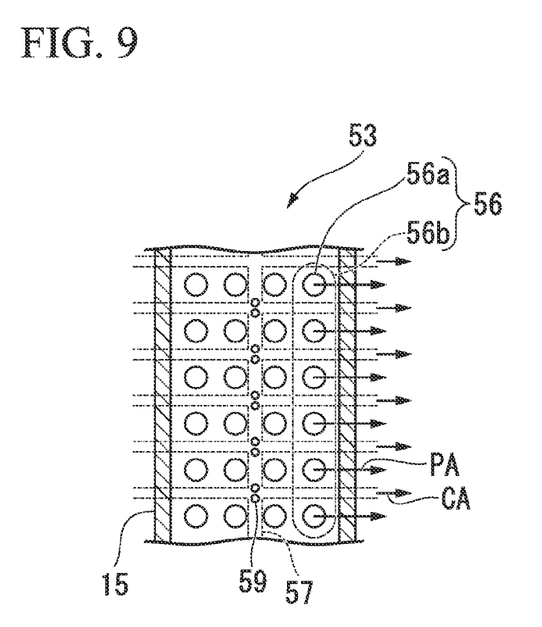
FIG. 9 is a diagram showing the positional relationship between the through-holes and the cooling grooves in the acoustic liner of the combustor regarding the gas turbine related to the fifth embodiment of the invention and is a diagram showing a modified example of FIG. 8.

In addition, as shown in FIG. 9, for example, a configuration is also possible in which the cooling grooves 57 parallel to the circumferential direction are formed between row of the through-holes 56b adjacent to each other and two auxiliary through-holes 59 are formed between the through-holes 56a adjacent to each other in the circumferential direction. In this case, the air film that is continuous in the circumferential direction can be more reliably formed and improvement in the effect of preventing the generation of the wall surface combustion can be achieved.

A detailed description of the embodiments of the present invention has been performed above. However, some design changes are also possible within a scope that does not depart from the technical idea of the invention.

For example, the configuration of the cooling grooves 57 are not limited to those in the embodiments described above, and it is acceptable if the cooling grooves 57 can be formed so as not to interfere with the through-holes 16a, and the cooling grooves 57 may also be configured in a mesh shape by, for example, being formed from one side to the other side in the circumferential direction toward the direction of the axis P and being formed from the other side to one side in the circumferential direction.

INDUSTRIAL APPLICABILITY

The present invention relates to a combustor and a gas turbine in which an air film that is continuous in a circumferential direction is formed on the inner peripheral surface of a combustion chamber, and thus the generation of the wall surface combustion can be prevented.

REFERENCE SIGNS LIST

1: gas turbine
2: compressor
3: combustor (gas turbine combustor)
4: turbine
5: rotor
6: exhaust chamber
A: compressed air
F: fuel
G: combustion gas
FA: premixed gas
10: fuel feeder
11: combustion chamber
12: transition piece
13: acoustic unit
15: acoustic liner
16: group of through-holes
16a: through-holes
16b: rows of through-holes
17: cooling grooves
P: axis
S: space (acoustic space)
CA: cooling air
PA: purge air
23: acoustic unit
27: cooling grooves
27a: transverse cooling grooves
27b: longitudinal cooling grooves
33: acoustic unit
36a: through-holes
46a: through-holes
48: opening portions
56: group of through-holes
56a: through-holes
56b: rows of through-holes
57: cooling grooves
59: auxiliary through-holes

The invention claimed is:

1. A gas turbine combustor comprising:
a combustion chamber inside which a combustion space is formed; and
an acoustic liner that is provided outside the combustion chamber and defines an acoustic space between the acoustic liner and an outer peripheral surface of the combustion chamber, wherein
through-holes through which the combustion space communicates with the acoustic space are formed in a wall of the combustion chamber,
a plurality of rows of the through-holes, wherein each row of the plurality of rows of the through-holes includes some of the through-holes aligned in a circumferential direction of the combustor, the plurality of rows of the through-holes arranged in a lengthwise direction of the combustor,
the through-holes of a first through-hole row are shifted with respect to the through-holes of a second through-hole row adjacent to the first through-hole row so that centers of the through-holes of the first and second through-hole rows adjacent each other are staggered in the circumferential direction of the combustor,
cooling grooves are formed within the wall of the combustion chamber, the cooling grooves being sandwiched between the outer peripheral surface and an inner peripheral surface of the combustion chamber and corresponds to a position where the acoustic liner is provided so as to avoid the through-holes, and
the cooling grooves include transverse cooling grooves extending in the circumferential direction of the combustor between rows of the through-holes, and longitudinal cooling grooves extending in the lengthwise direction of the combustor between the through-holes and connecting the transverse cooling grooves adjacent to each other in the lengthwise direction of the combustor.

2. The gas turbine combustor according to claim 1, wherein the through-holes are made such that a hole diameter thereof on an upstream side in the lengthwise direction of the combustor is large compared to a hole diameter on a downstream side.

3. The gas turbine combustor according to claim 1, wherein the through-holes are inclined toward the combustion space in a radial direction of the combustion chamber as it goes toward a downstream side from an upstream side in the lengthwise direction of the combustor.

4. The gas turbine combustor according to claim 1, wherein the through-holes have an enlarged diameter on at least one of an opening in the outer peripheral surface of the combustion chamber and an opening in an inner peripheral surface of the combustion chamber.

5. A gas turbine combustor comprising:
a combustion chamber inside which a combustion space is formed; and
an acoustic liner that is provided outside the combustion chamber and defines an acoustic space between the acoustic liner and an outer peripheral surface of the combustion chamber, wherein
through-holes through which the combustion space communicates with the acoustic space are formed in a wall of the combustion chamber,
a plurality of rows of the through-holes, wherein each row of the plurality of rows of the through-holes includes some of the through-holes aligned in a circumferential direction of the combustor, the plurality of rows of the through-holes arranged in a lengthwise direction of the combustor,
the through-holes of a first through-hole row are coincided with respect to the through-holes of a second through-hole row adjacent to the first through-hole row,
cooling grooves are formed within the wall of the combustion chamber, the cooling grooves being sandwiched between the outer peripheral surface and an inner peripheral surface of the combustion chamber,
the cooling grooves include transverse cooling grooves and longitudinal cooling grooves,
the transverse cooling grooves extend in the circumferential direction of the combustor between rows of the through-holes adjacent to each other in the lengthwise direction of the combustor, the longitudinal cooling grooves extend in the lengthwise direction of the combustor between the through-holes adjacent to each other in the circumferential direction of the combustor, auxiliary through-holes are formed between the cooling grooves and the combustion space to allow fluid communication between the cooling grooves and combustion space, and the auxiliary through-holes are formed between the through-holes adjacent to each other in the circumferential direction of the combustor.

6. A gas turbine comprising:
the combustor according to claim 1.

7. A gas turbine comprising:
the combustor according to claim 5.

* * * * *